United States Patent

Pragg, III

[11] 3,818,661
[45] June 25, 1974

[54] FASTENING DEVICE FOR PORTABLE PANELS

[76] Inventor: Alex Van Pragg, III, 20200 Lucille Ave., Cupertino, Calif. 95014

[22] Filed: Nov. 22, 1971

[21] Appl. No.: 200,924

[52] U.S. Cl.................................. 52/282, 52/285
[51] Int. Cl................................................ E04b 2/82
[58] Field of Search..... 287/20.924, 20.925, 20.926, 287/20.927, 189.36 F, 189.36 D, 54; 52/285, 282, 127

[56] References Cited
UNITED STATES PATENTS

| | | | |
|---|---|---|---|
| 2,329,815 | 9/1943 | Attwood | 312/257 R |
| 2,737,268 | 3/1956 | Smith | 287/54 C |
| 3,042,978 | 7/1962 | Eames et al. | 287/189.36 F X |
| 3,290,131 | 12/1966 | Neal, Jr. | 287/189.36 D UX |
| 3,421,459 | 1/1969 | Sherwood | 52/285 X |

FOREIGN PATENTS OR APPLICATIONS

| | | | |
|---|---|---|---|
| 1,110,457 | 10/1955 | France | 52/285 |
| 73,151 | 9/1951 | Denmark | 287/20.924 |
| 493,900 | 6/1953 | Canada | 287/20.924 |
| 782,428 | 9/1957 | Great Britain | 287/189.36 F |
| 853,581 | 11/1960 | Great Britain | 287/189.36 F |

Primary Examiner—Andrew V. Kundrat
Attorney, Agent, or Firm—Limbach, Limbach & Sutton

[57] ABSTRACT

A fastening member for joining panels such as portable partitions, walls, building floors, or building roofs. The fastening member includes one or more elongated hollow channels having a cross-sectional shape of a right triangle. A locking element for fastening with a mating locking element on a panel is slidable along the length of the elongated channel to provide adjustment of its position.

7 Claims, 9 Drawing Figures

PATENTED JUN 25 1974　　　　　　　　　　　　　　3,818,661

FASTENING DEVICE FOR PORTABLE PANELS

BACKGROUND OF THE INVENTION

The present invention relates generally to a method and apparatus for building wall construction, and more particularly relates to a method and apparatus for joining two or more panels together with a finite angle therebetween.

With increased cost of building construction, a need has been developing in recent years for building construction techniques and apparatus which allow a minimum of construction labor time. An increased flexibility in the specific types of structures that can be created with a few basic elements contributes to the reduced labor time and thus the cost of a structure. It is an object of the present invention to provide yet a further improvement in such methods and apparatus.

A popular method for dividing large building areas into smaller areas, such as for office use, utilizes portable partitions. A number of standard partition panels are joined together in a manner desired to form individual offices or cubicles. The partitions extend to just a few feet off the floor or may extend completely to the ceiling. It is also an object of the present invention to provide an improved member for locking such panels together with a finite angle therebetween that has an improved flexibility and ease in assembly and disassembly.

SUMMARY OF THE INVENTION

These and additional objects of the present invention are realized by an elongated fastening member for joining two panels together into a unitary structure, the elongated fastening member including one, two, three or four elongated channels that each have the shape in cross-section of a right triangle. A locking plate which contains a latching means for connection with an associated latch on a panel is made to be slidably along the surface of each elongated channel that forms the hypotenuse of the triangle. The locking plates of each channel are held in place therealong against the force of gravity but are not held so strongly to prevent them from being moved by hand along the length of the channel. The movability of the locking plate allows adjustment of each individual elongated channel to the lock positions of a particular panel to be connected therewith. The construction of each individual channel in the shape of a right triangle gives the added flexibility of being able to attach two, three or four channels together at non-hypotenuse sides thereof to form a unitary fastening member for joining a plurality of panels together in a particular application. A wide variety of particular panel fastening requirements may be met by multiple use of a single basic fastening channel member according to the present invention.

Additional objects and advantages of the present invention are pointed out in the following description that should be taken in conjunction with the accompanying drawings.

DESCRIPTION OF THE PREFERRED EMBODIMENTS

Figure 1:
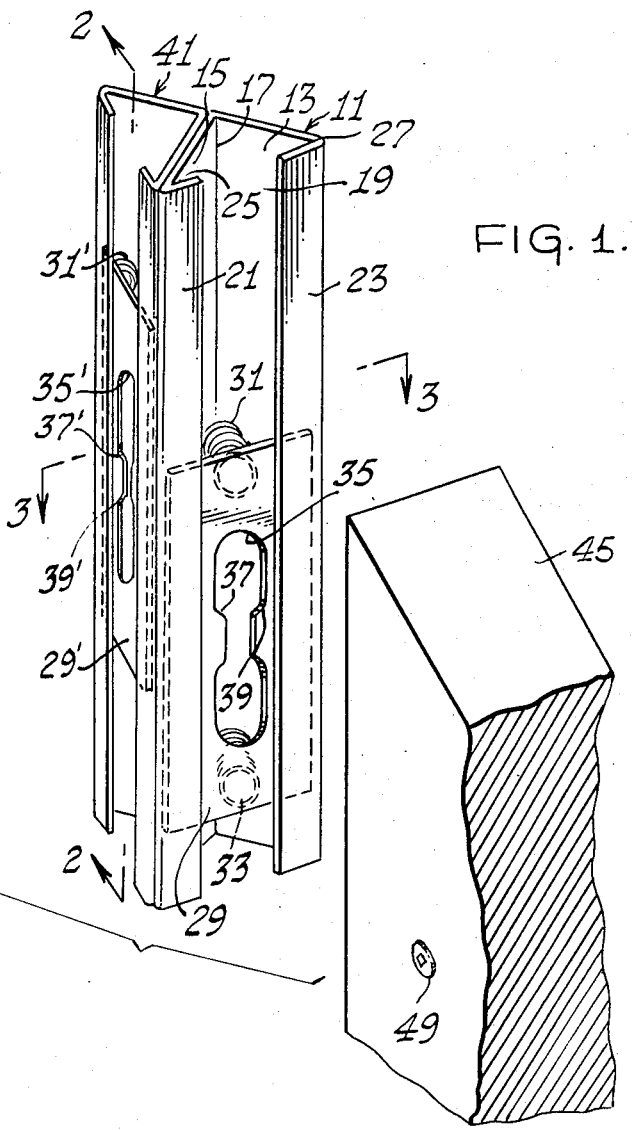
FIG. 1 is one form of the improved fastening member according to the present invention in conjunction with a pair of panels to be connected together.
Figure 2:
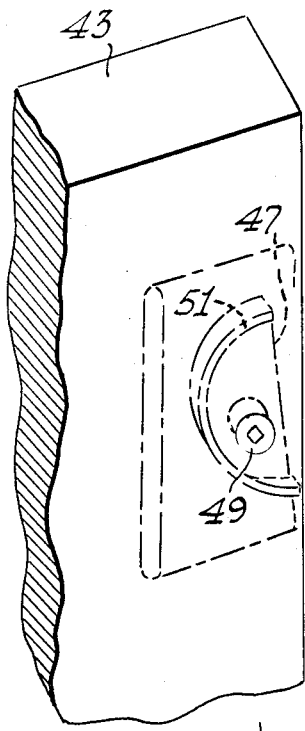
FIG. 2 is a sectional view of the fastening member shown in FIG. 1 taken across section 2—2.
Figure 3:
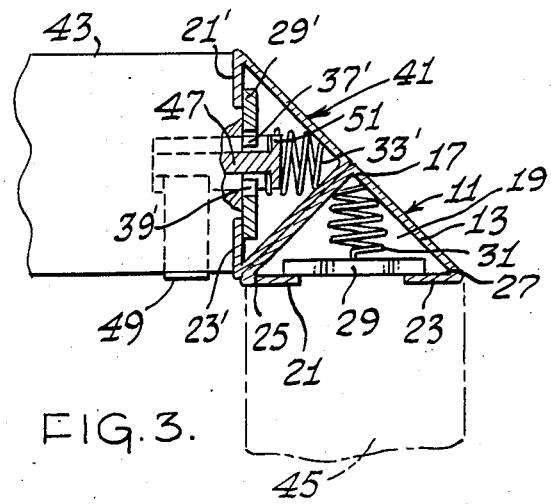
FIG. 3 is a sectional view of the fastening member and panels according to FIG. 1 taken across section 3—3.

Referring to FIGS. 1-3, the basic fastening member of the present invention is illustrated in detail in one particular form thereof. An elongated hollow channel 11 is formed from a long and narrow sheet of metal which is bent into the form illustrated in FIG. 1. Flat sides 13 and 15 are joined at the crease 17 that extends along the length of the channel member 11. Sides 13 and 15 are formed with a right angle therebetween. The sides 13 and 15 are preferably and most conveniently constructed of solid material and are of substantially an equal width. In cross-section, the channel 11 is in the shape of a right triangle. A hypotenuse side of the right triangle contains a slit opening 19 formed by a pair of lips 21 and 23 that are also part of the hypotenuse side of the right triangle shape of the channel 11. The lip 21 is integral and immediately adjacent with the side 15 of the channel at a crease 25. An acute angle is formed between the lip surface 21 and the side 15. Similarly, the lip surface 23 is formed integrally with the side 13 along a crease 27 and forms an acute angle therewith.

A locking plate 29 is held within the channel member 11 and shaped to be freely movable along the length of the channel. A pair of springs 31 and 33 are attached to opposite ends of the locking plate 29 and to its rear surface. The springs 31 and 33 are designed to be placed in compression between an interior surface of the channel 11 and the rear surface of the locking plate 29. This holds the locking plate 29 against the interior surface of the lips 21 and 23. The springs 31 and 33 are designed to exert only enough force to hold the locking plate 29 from falling within the channel 11 under the influence of gravity and dynamic forces created by moving the channels. The springs 31 and 33 are not made so strong as to prevent movement of the locking plate along the length of the channel by hand. The springs 31 and 33 may be replaced by some other appropriate mechanism for accomplishing this result, such as a magnetic coupling between the locking plate 29 and the channel 11.

The locking plate 29 includes an opening 35 therein which serves as a female latching member. The opening 35 is an elongated one having a pair of projections 37 and 39 extending inwardly of the opening at a position about midway along its length. The projections 37 and 39 do not extend completely across the opening 35 in order to properly mate with existing rotating cam male latching elements. Of course, other specific latching mechanisms may be provided on the locking plate 29 in place of the opening 35, but the arrangement shown has the advantage that the locking plate 29 may be constructed out of a flat piece of sheet metal by a simple punching operation. The locking plate remains a planar element.

The channel 11 described above as the basic element of the fastening member of the present invention and has the advantage that it may be connected with one or more additional channels to form a fastening member suited for a particular application. In FIGS. 1-3, a second elongated channel member 41 is of the same design as the channel 11. The two channels are attached rigidly by bolting or welding or some other appropriate means at their sides. The resulting fastening member provides a means for forming a rigid structure between two panels 43 and 45 with a 90° angle therebetween, as can best be seen in FIG. 3. The locking plates provided in the channel 41 are the same as the locking plates provided in the channel 11, so are given the same reference characters with a prime (') added. The panels 43 and 45 may be, in one application, portable wall partitions for dividing up a building interior area for a purpose, as an example, of forming small office areas from a larger one.

The locking plates 29 and 29' are designed to be used with existing fastening elements of portable walls. One of these fastening elements is outlined in FIGS. 1-3 as part of the panel 43. This fastening element includes a half-circle plate 47 that is rotatable about a tool opening 49. The circumferential surface of the half-circle plate 47 includes a flange 51 which extends on either side of the plate 47. When the plate 47 is in the position shown in FIGS. 2 and 3, wherein the panel 43 is rigidly connected with the channel 41, an inner circumferential surface of the flange 51 contacts the projections 37' and 39' of the locking plate 29'. Thereby, the locking plate 29' is urged against the inner surface of lips 21' and 23' of the hypotenuse side of the right triangle shaped channel 41. The result is a firm grip of the lips 21' and 23' by placing them under compression between an edge of the wall 43 and the locking plate 29'. The result is a firm engagement which prevents panel 43 from falling due to the force of gravity thereon even though it may not be otherwise supported against vertical forces.

The flexibility of the fastening system shown in FIGS. 1-3 as well as its simplicity in construction is of significant advantage. The fact that the locking plates 29 and 29' may be slid anywhere along the length of their respective channels 11 and 41 permits connection with panels having fastening elements at various different vertical elevations. The right triangular shape of the individual channels permits a single fastening element to be built up according to a specific fastening requirement. One particular application has been illustrated with respect to FIGS. 1-3 and additional uses of the same basic right triangle shape channel member are illustrated hereinafter.

Figure 4:
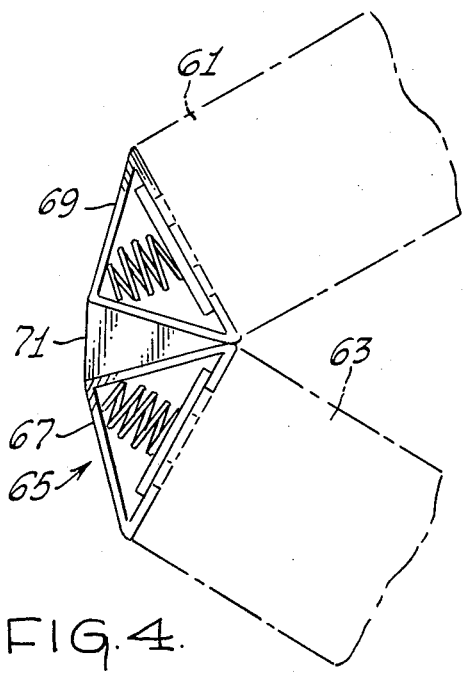
FIG. 4 shows a variation of the fastening member of FIG. 1.

Referring to FIG. 4, a pair of panels 61 and 63 are joined by a fastening member 65 that includes a pair of right triangle shaped channels 67 and 69. In this application, however, the standard channels are not connected with their sides in a close abutting relationship but rather are connected together through a wedge 71. The wedge 71 is used to connect the two panels 61 and 63 together at some angle other than the 90° relationship illustrated in FIGS. 1-3.

Figure 5:
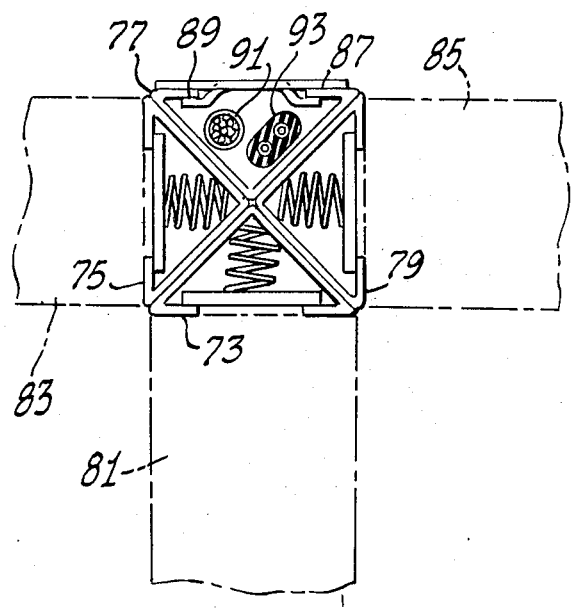
FIG. 5 illustrates a fastening member for connecting three panels together and providing an electrical conduit as well.

Referring to FIG. 5, the use of four of the basic right triangle channel members 73, 75, 77 and 79 is shown. All four of the channels are rigidly connected to each other by welding, bolts or some other appropriate means, and their sides are in immediate abutting relationship with each other. Channels 73, 75 and 79 are fastened, respectively, to panels 81, 83 and 85. The fourth channel member 77 is provided with a covering plate 87 which has a spring fastening member 89 attached thereto for gripping the lips of the channel 77. No locking plate is utilized in the channel 77, and thus a clear conduit is provided in which utilities may be extended. For instance, electrical cables 91 and 93 may be provided in the extra channel 77 in order to supply electrical plugs which are a part of the panel members 81, 83 and 85.

Figure 6:
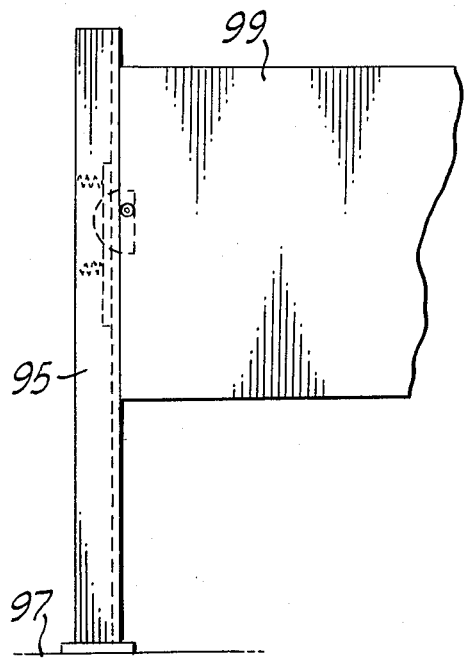
FIG. 6 shows one use of a fastening element according to the present invention to hold a panel off the floor.

Referring to FIG. 6, a fastening member 95 is shown in the most common vertical position resting on a building floor 97 and includes at least one triangle shaped channel as illustrated hereinabove. A panel 99 is attached thereto in a manner discussed above. The panel 99 can be any height desired and it is shown in FIG. 6 to have its lower edge a distance above the floor 97. This particular application illustrates the ability of the channel and locking plate arrangement discussed above to support vertical loads.

Figure 7:
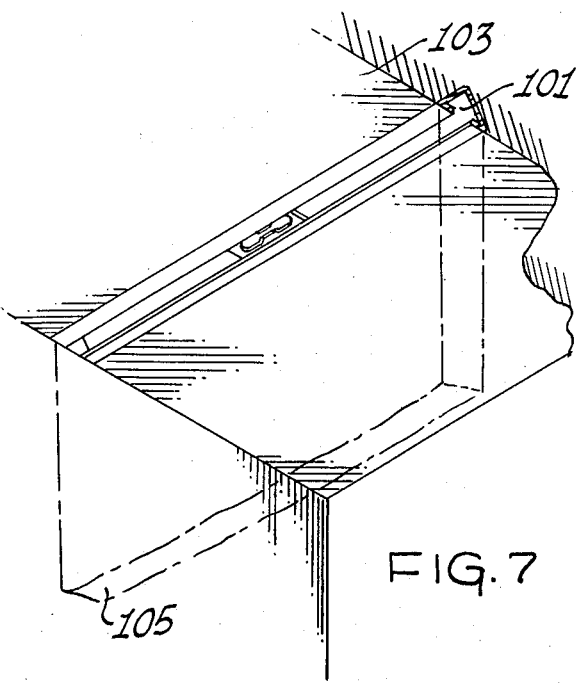
FIG. 7 shows a fastening element of the present invention installed in a ceiling.

Referring to FIG. 7, a channel 101 according to the present invention is permanently installed in a ceiling 103 of a building. A portable wall 105, indicated in dashed lines, may be positioned and held by the channel 101 for easy removal thereof when desired.

Figure 8:
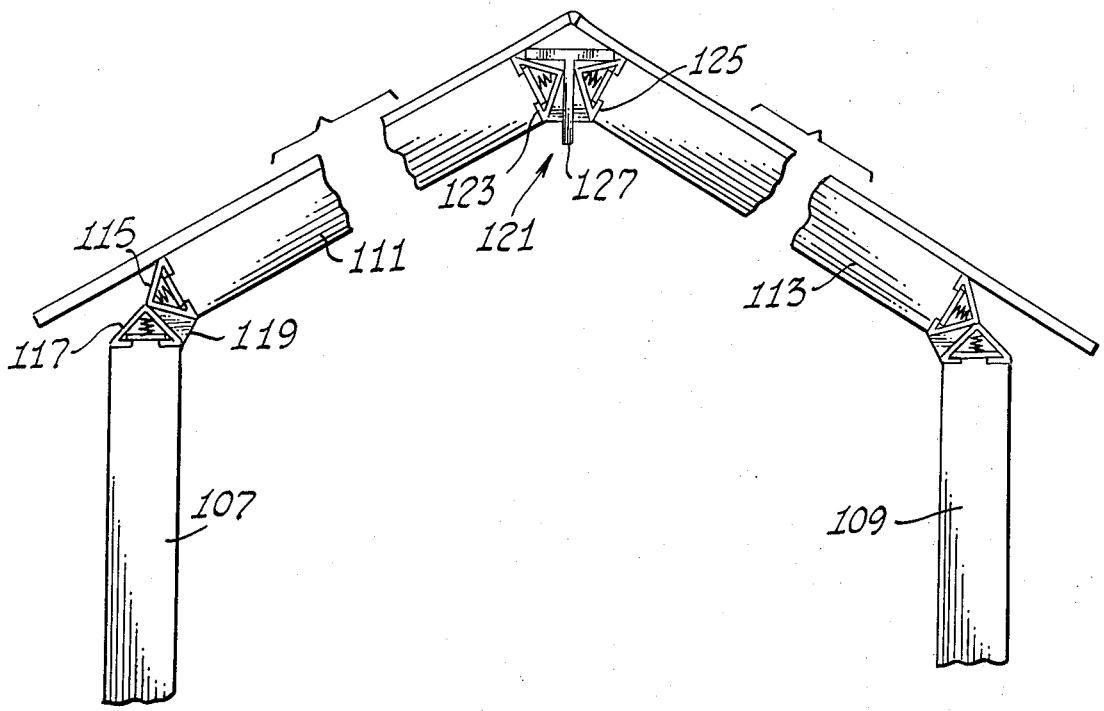
FIG. 8 illustrates in one specific embodiment the use of a fastening element according to the present invention in housing construction.

Not only does the fastening element of the present invention have use for interior wall partition assembly, but it also may be utilized to construct low-cost housing or portable buildings. Referring to FIG. 8, a roof and wall construction using the fastening element according to the present invention is shown in a schematic diagram. Wall panels 107 and 109 support, respectively, roof panels 111 and 113. The roof panel 111 is connected to the wall 107 by means of a pair of right triangle shaped channel members 115 and 117 of a construction that have been discussed hereinabove. A wedge 119 is provided in order to give the proper angle between the pitched roof panel 111 and the vertical wall 107. The channels 115 and 117 are rigidly connected to each other through the wedge 119 to form a fastening element that is connected with panels 107 and 111 by means of fasteners therein, as discussed previously. The roof panel 113 is connected with the wall panel 109 in a similar manner. The two roof sections 111 and 113 are connected together by a fastening member 121 that includes a rigid structure of a pair of right triangle shaped channels 123 and 125 connected to a rigid T-beam 127 with the use of wedges to give the appropriate angular relationship between the roof panels 111 and 113. An advantage of such a structure is its reduced amount of labor time required to build.

Figure 9:
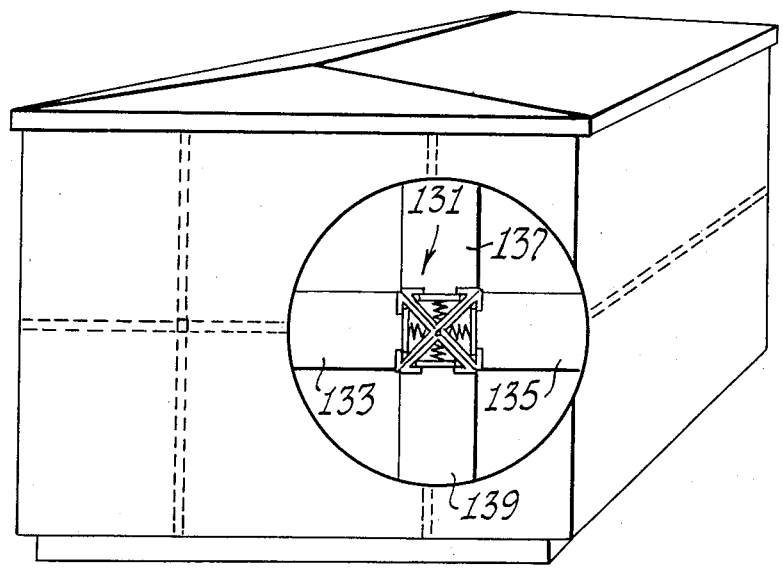
FIG. 9 illustrates generally the use of the fastening element of the present invention to form a free standing building.

Referring to FIG. 9, a free standing building is illustrated that is constructed with a plurality of panels and fastening members formed of the right triangle shaped triangle members discussed above. Shown in magnified form in FIG. 9 is a cross-sectional view of a fastening member 131 that includes four right triangle channel members fastened rigidly together to form in cross-section a square fastening member. A combination of floor and ceiling panels 133 and 135 are connected thereto. A second story wall 137 is also connected with the fastening member 131 and a first story wall 139 is connected therewith. The walls and ceilings may be of any appropriate material and thickness depending on the mechanical load to be carried thereby and may even be concrete panels. An advantage of a building construction as illustrated in FIGS. 8 and 9 is the ease in disassembly of the building.

The particular embodiments of the fastening techniques of the present invention described above have many advantages. For other applications, fastening elements may be provided which utilize only a portion of the novel elements of those discussed in detail above. For instance, it may be desirable in some circumstances to use a single square or rectangular cross-sectional channel with a slidable locking plate as illustrated with respect to the Figures. Also the locking plate need not necessarily be captured within the channel but could be held thereby in some other manner. It will be understood, therefore, that the scope of the present invention is not necessarily limited by all of the details of the preferred embodiments described above with respect to the Figures but rather the invention is entitled to its full scope as defined by the appended claims.

I claim:

1. A construction fastening device, comprising:
   an elongated hollow channel having enclosing walls with a cross-sectional shape substantially that of a right triangle with a hypotenuse side and two substantially equal length non-hypotenuse sides, said hypotenuse side of the channel including an elongated slot therealong for permitting access to the interior of said channel and planar lips on either side of the slot with one lip attached to each of said non-hypotenuse sides, and
   at least one locking plate positioned within said channel against the inside surfaces of said lips in a manner to be restrained from falling along the elongated member under the weight of the locking plate but also in a manner to permit movement of the locking plate along the length of the channel, whereby the locking plate may be positioned relative to a second mating locking member of a construction component to be fastened thereto said locking plate additionally including a rigid planar element having an elongated opening therethrough that is oriented with its length in the direction of the length of the channel slot, said elongated opening having stubs intermediate of its ends in the long direction that extend part way from each side toward the middle of said opening, said stubs being exposed through the slot of said channel, whereby said stubs may be contacted from the rear and pulled against the inside surfaces of said lips.

2. The construction fastening device of claim 1 wherein the locking plate is held against the elongated channel by a frictional engagement therewith that may be overcome by exerting force against the locking plate in a direction of the length of the elongated channel.

3. A construction fastening device, comprising:
   an elongated hollow channel having a three-sided triangular shape as viewed in a plane perpendicular to the length of said channel, one side of said channel including an elongated slot along its length for permitting access to the interior of said channel and planar lips on either side of the slot with one lip attached to a distinct other side of the channel, and
   at least one flat planar locking plate having an elongated opening there through aligned with the channel elongated slot for receiving a mating locking element from another construction member, said locking plate being positioned against inside surfaces of said lips in a manner to be restrained from falling along the elongated channel under its own weight but being movable therealong, whereby the locking plate may be positioned relative to said second locking element of a construction member, said locking plate including stubs extending part way into the elongated opening of the plate at a position intermediate of the ends of the plate opening in its longest direction, said stubs being exposed through the slot of said channel, whereby said stubs may be contacted from the rear and pulled against the inside surfaces of said lips.

4. A construction fastening device, comprising:
   a plurality of elongated hollow channels that are each of substantially the same triangular shape in cross-section, one wall of each channel having an elongated slot therealong for permitting access to its interior with flat planar lips extending along the length of said channel on either side of the slot and each attached to one of the other of said triangular sides, said channels being fastened together in a manner that their elongated slots have their lengths extending in the same direction and exposed to the outside of the composite structure, and
   each channel containing within its hollow portion at least one flat planar locking plate having an opening therein aligned with the channel elongated slot for receiving a mating locking element from another construction member, said locking plate being positioned against inside surfaces of said lips in a manner to be restrained from falling along the elongated channel under its own weight but being movable therealong, whereby the locking plate may be positioned relative to said second locking element of a construction member, said plate additionally including stubs extending part way into the plate opening from opposite sides thereof toward its middle, said stubs being exposed through the slot of the channel.

5. The construction fastening device according to claim 4 wherein each of the elongated hollow channels that are connected together have a cross-sectional shape of a right triangle with the elongated slot being positioned in its hypotenuse side.

6. The construction fastening device of claim 5 wherein exactly four elongated hollow channels are formed together in a rigid square shaped structure in cross-sectional outline with an elongated slot along each side of the square.

7. A structure comprising:
   a fastening member including at least two elongated hollow channels rigidly held together, each of said channels having:
   a three-sided triangular shape as viewed in a plane perpendicular to the length of said channel, one side of said channel including an elongated slot along its length for permitting access to the interior of said channel and planar lips on either side of the slot with one lip attached to a distinct other side of the channel, and at least one flat planar locking plate having an elongated opening therein aligned with the channel elongated slot, said locking plate being positioned against inside surfaces of said lips in a manner to be restrained from falling along the elongated channel under its own weight but being movable therealong, whereby the locking plate may be positioned relative to said second locking element of a construction member, said locking plate additionally including a pair of stubs extending from opposite sides of the plate opening toward its middle, said stubs being exposed through the slot of said channel, at least two construction panels, one associated with each of said at least two elongated channels, each panel having a fastening element along its edge constructed to positively engage the stubs of a locking plate of a channel and pull the locking plate against the inside surfaces of the channel lips, whereby said fastening member is attached to said at least two construction panels by sliding the captured locking plates to positions opposite the fastening members of said panels and the operation of said fastening members.

* * * * *